US009123278B2

(12) United States Patent
Tripathi et al.

(10) Patent No.: US 9,123,278 B2
(45) Date of Patent: Sep. 1, 2015

(54) PERFORMING INLINE CHROMA DOWNSAMPLING WITH REDUCED POWER CONSUMPTION

(75) Inventors: Brijesh Tripathi, San Jose, CA (US); Craig M. Okruhlica, San Jose, CA (US); Nitin Bhargava, San Jose, CA (US)

(73) Assignee: Apple Inc., Cupertino, CA (US)

( * ) Notice: Subject to any disclaimer, the term of this patent is extended or adjusted under 35 U.S.C. 154(b) by 342 days.

(21) Appl. No.: 13/404,733

(22) Filed: Feb. 24, 2012

(65) Prior Publication Data

US 2013/0222413 A1 Aug. 29, 2013

(51) Int. Cl.

*G09G 5/02* (2006.01)
*G09G 5/391* (2006.01)
*H04N 9/64* (2006.01)
*G09G 5/373* (2006.01)

(52) U.S. Cl.

CPC .................. *G09G 5/02* (2013.01); *G09G 5/391* (2013.01); *G09G 5/373* (2013.01); *G09G 2340/02* (2013.01); *G09G 2340/0428* (2013.01)

(58) Field of Classification Search

None
See application file for complete search history.

(56) References Cited

U.S. PATENT DOCUMENTS 5,272,468 A * 12/1993 Read ............................ 345/604
5,638,128 A * 6/1997 Hoogenboom et al. . 375/240.15
6,134,574 A * 10/2000 Oberman et al. ............ 708/551
6,674,479 B2 1/2004 Cook et al.
7,158,668 B2 1/2007 Munsil et al.
7,400,762 B2 * 7/2008 Munsil et al. ................ 382/162
7,417,647 B2 8/2008 Jeffrey
7,644,256 B2 * 1/2010 Nordmark et al. ............ 712/220
7,868,898 B2 * 1/2011 Jeffrey et al. ................ 345/572
8,270,002 B1 * 9/2012 Walton ......................... 358/1.15
2006/0002471 A1 * 1/2006 Lippincott et al. ....... 375/240.16
2006/0023794 A1 * 2/2006 Wan et al. ................ 375/240.29
2007/0237391 A1 * 10/2007 Wu .............................. 382/166
2009/0103825 A1 * 4/2009 Wang et al. .................. 382/250
2010/0164768 A1 * 7/2010 Mitikiri et al. ................ 341/132
2012/0026368 A1 2/2012 Côté et al.

OTHER PUBLICATIONS

[online], [retrieved Aug. 16, 2014], "LogiCORE IP Resampler v1.0 Product Guide", http://www.xilinx.com, Oct. 2011.*

* cited by examiner

*Primary Examiner* — Ulka Chauhan
*Assistant Examiner* — Patrick F Valdez
(74) *Attorney, Agent, or Firm* — Rory D. Rankin; Meyertons, Hood, Kivlin, Kowert & Goetzel, P.C.

(57) ABSTRACT

Methods and graphics processing pipelines for performing inline chroma downsampling of pixel data. The graphics processing pipeline includes a chroma downsampling unit for performing buffer-free downsampling of chroma pixel components. A vertical column of chroma pixel components is received in each clock cycle by the chroma downsampling unit, and downsampled chroma pixel components are generated on every clock cycle or every other clock cycle. Vertical, horizontal, and vertical and horizontal downsampling can be performed without buffers by the chroma downsampling unit. A programmable configuration register in the chroma downsampling unit determines the type of downsampling that is implemented.

19 Claims, 9 Drawing Sheets

PERFORMING INLINE CHROMA DOWNSAMPLING WITH REDUCED POWER CONSUMPTION

BACKGROUND

1. Field of the Invention

The present invention relates generally to graphics information processing, and in particular to methods and mechanisms for performing chroma downsampling.

2. Description of the Related Art

Computing devices and in particular mobile devices often have limited memory resources and a finite power source such as a battery. Computing devices with displays usually include different types of graphics hardware to manipulate and display video and images. Graphics hardware can perform many different types of operations to generate and process images intended for a display. One common operation performed by graphics hardware is the downsampling of chroma pixel components.

Chroma pixel components are downsampled (i.e., subsampled) to compress the amount of data used to encode an image or video stream. The terms "downsample" and "subsample" may be used interchangeably throughout this disclosure. The term 'downsampling' may herein be used to refer to, among other things, the change in color format of an image from a first color format to a second color format in which the number of chroma samples relative to luma samples in the first color format is higher than in the second color format. In other words, 'downsampling' reduces the number of chroma samples in the image, while leaving the number of luma samples unchanged.

In some widely-used formats (e.g., YCbCr), images may be transmitted with a brightness component (luminance) and two color components (chrominance). The YCbCr color space format (also referred to as YUV) utilizes a luma signal 'Y' to represent brightness, and color difference (or chroma) signals 'Cb' (representing blue) and 'Cr' (representing red) to represent blue and red color differences, respectively. Generally speaking, the human eye has less spatial acuity to the color information than to the luminance information, and so the amount of information devoted to the color components may be reduced without noticeably altering the image as it is perceived by the human eye.

There are several types of image and video formats that are commonly used to encode pixel information. Within the YCbCr format, several format variations may be used, such as chroma subsampling formats (i.e., ratios) 4:4:4, 4:2:2, and 4:2:0. The format 4:4:4 does not utilize subsampling, and so each of the three Y, Cb, and Cr components has the same sample rate. The term 4:2:2 refers to the ratio of the number of Y signal samples to the number of Cb and Cr signal samples in the color scheme. The format 4:2:2 indicates that for every four Y samples, the Cb and Cr signals are each sampled twice. On a pixel basis, this can be restated as for every pixel pair, there are two luma samples ($Y_1$ and $Y_2$) and a Cb and Cr shared among the two luma samples.

The format 4:2:0 specifies that for every four luma samples, the Cb and Cr signals are each sampled once. The first number of the 4:2:0 color format "4" represents the number of luma samples as a baseline. The second number "2" represents a defined horizontal subsampling with respect to the luma samples. The third number "0" represents a defined vertical subsampling, which in this case is a 2:1 vertical subsampling.

Typically, buffers are utilized to store pixel data in order to perform chroma downsampling on an image to generate the 4:2:2 or 4:2:0 formats. However, these buffers require large amounts of silicon area and can consume additional power, increasing the cost of the graphics hardware and reducing the battery life of mobile devices.

SUMMARY

Various apparatuses and methods for performing inline, buffer-free downsampling of chroma pixel components of a source image are contemplated. In one embodiment, an apparatus may include a graphics processing pipeline for processing graphics data, and one of the stages of the pipeline may be a chroma downsampling unit. In one embodiment, a color space conversion (CSC) unit may precede the chroma downsampling unit in the pipeline, and the CSC unit may convey YCbCr data to the chroma downsampling unit.

In one embodiment, the YCbCr data received by the chroma downsampling unit may be in a 4:4:4 or 4:2:2 format. The output of the chroma downsampling unit may vary depending on the format of the input received and the type of downsampling being performed. The type of downsampling being performed may be programmable via a configuration register located within the chroma downsampling unit. For example, horizontal and vertical downsampling may be individually enabled via the configuration register.

In one embodiment, the chroma downsampling unit may accept four pixels per clock from the CSC unit. The four pixels may be located within a single column of the image. In a first mode, the chroma downsampling unit may perform horizontal downsampling of 4:4:4 format data to produce four pixels of 4:2:2 format data on every other clock. In a second mode, the chroma downsampling unit may perform vertical downsampling of 4:2:2 format data to produce two pixels of 4:2:0 format data on every clock. In a third mode, the chroma downsampling unit may perform horizontal and vertical downsampling of 4:4:4 format data to produce two pixels of 4:2:0 format data on every other clock. The three modes may be selected via the configuration register.

In one embodiment, the downsampling may be performed by computing the average of one or more pairs of chroma pixel components. If horizontal downsampling is enabled, then one or more averages of one or more pairs of chroma pixel components from separate columns may be computed. If vertical downsampling is enabled, then one or more averages of one or more pairs of chroma pixel components from the same column may be computed. If vertical and horizontal downsampling are both enabled, then one or more averages of one or more groups of four chroma pixel components from two separate columns may be computed. In one embodiment, a rounding component may be added to the sum of the chroma pixel components in order to implement rounding functionality during the average computation.

Vertical downsampling may be performed inline after receiving a column of even-numbered chroma pixel components in each clock cycle. The chroma pixel components may be received and stored in registers prior to the average being computed. For horizontal downsampling, each pair of pixels from the columns of chroma pixel components received on consecutive clock cycles may be added together and then divided by two to compute the average value. The first column of chroma pixel components may be written to a first set of registers in the first clock cycle and then clocked through to a second set of registers in the second clock cycle. The second clock cycle may be the clock cycle immediately after the first clock cycle. The second column of chroma pixel components received in the second clock cycle may be written to the first set of registers. The values from the first set and second set of registers may be added together in a third clock cycle and then divided by two in a fourth clock cycle to calculate the average of the pairs of chroma pixel components from both columns.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION OF EMBODIMENTS

Figure 1:
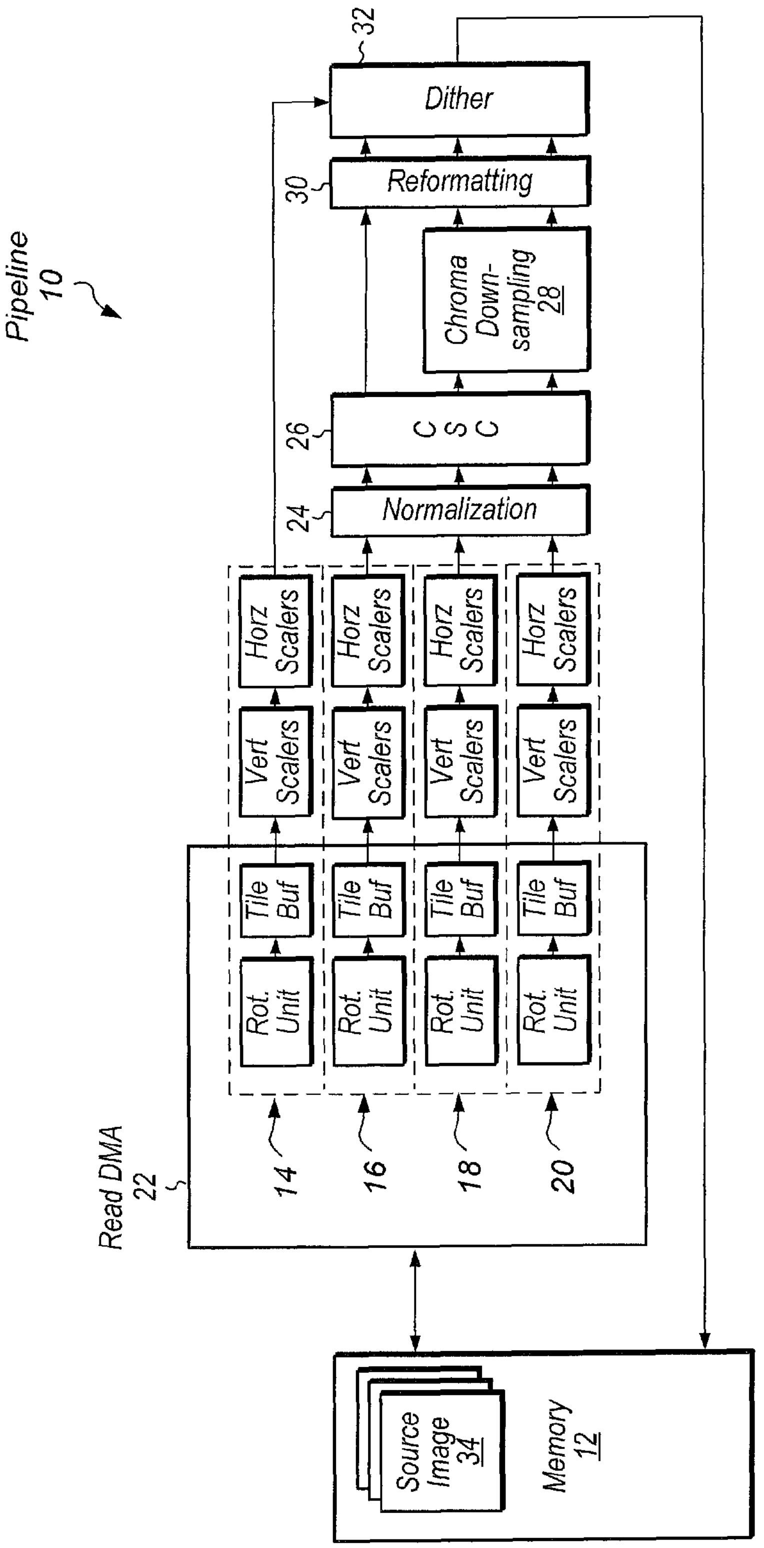
FIG. 1 is a block diagram that illustrates one embodiment of a graphics processing pipeline.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "An apparatus comprising a fetch unit . . . . " Such a claim does not foreclose the apparatus from including additional components (e.g., a processor, a cache, a memory controller).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a graphics processing pipeline is shown. In various embodiments, pipeline 10 may be incorporated within a system on chip (SoC), an integrated circuit (IC), an application specific integrated circuit (ASIC), an apparatus, a processor, a processor core or any of various other similar devices. In one embodiment, pipeline 10 may be a separate processor chip or co-processor. In some embodiments, pipeline 10 may deliver graphics data to a display controller or display device. In other embodiments, the graphics processing pipeline may deliver graphics data to a storage location in memory, for further processing or for later consumption by a display device. In some embodiments, two or more instances of pipeline 10 may be included within a SoC or other device.

Source image 34 may be stored in memory 12, and source image 34 may be a still image or a frame of a video stream. In other embodiments, source image 34 may be stored in other locations. Source image 34 is representative of any number of images, videos, or graphics data that may be stored in memory 12 and processed by pipeline 10. Memory 12 is representative of any number and type of memory devices (e.g., dynamic random access memory (DRAM), cache).

Source image 34 may be represented by large numbers of discrete picture elements known as pixels. In digital imaging, the smallest item of information in an image or video frame may be referred to as a "pixel". Pixels are generally arranged in a regular two-dimensional grid. Each pixel in source image 34 may be represented by one or more pixel components. The pixel components may include color values for each color in the color space in which source image 34 is represented. For example, the color space may be a red-green-blue (RGB) color space. Each pixel may thus be represented by a red component, a green component, and a blue component. In one embodiment, the value of a color component may range from zero to $2^{N-1}$, wherein 'N' is the number of bits used to represent the value. The value of each color component may represent a brightness or intensity of the corresponding color in that pixel. Other color spaces may also be used, such as YCbCr. Furthermore, additional pixel components may be included. For example, an alpha value for blending may be included with the RGB components to form an ARGB color space. The number of bits used to store each pixel may depend on the particular format being utilized. For example, pixels in some systems may require 8 bits, whereas pixels in other systems may require 10 bits, and so on, with various numbers of bits per pixel being used in various systems.

Pipeline 10 may include four separate channels 14-20 to process up to four color components per pixel. Each channel may include a rotation unit, a set of tile buffers, a set of vertical scalers, and a set of horizontal scalers. In one embodiment, channel 14 may process an alpha channel. In other embodiments, channel 14 may not be utilized, and instead only three channels 16-20, corresponding to three color components, may be utilized. The read direct memory access (RDMA) unit 22 may be configured to read graphics data (e.g., source image 34) from memory 12. RDMA unit 22 may include four rotation units, four tile buffers, and a DMA buffer (not shown). The four tile buffers may be utilized for storing rotated tiles of source image 34.

There may be a plurality of vertical scalers and horizontal scalers for each color component of the source image. Each set of vertical scalers may fetch a column of pixels from the corresponding set of tile buffers. In another embodiment, pixels may be conveyed to the vertical scalers from the tile buffers. Each set of vertical scalers per channel may include any number of vertical scalers. In one embodiment, there may be four separate vertical scalers within pipeline 10 for each color component channel. In other embodiments, other numbers of vertical scalers may be utilized per color component channel.

Source image 34 may be partitioned into a plurality of tiles and may be processed by the rotation units on a tile-by-tile basis, and tiles that have been rotated may be stored in one of the tile buffers in a respective color component channel. In one embodiment, there may be four tile buffers per channel, although in other embodiments, other numbers of tile buffers may be utilized. In one embodiment, the vertical scalers may fetch a column of pixels from corresponding tile buffers. The column of pixels may extend through one or more tiles of the source image.

Source image 34 may be partitioned into tiles, and in one embodiment, the tiles may be 16 rows of pixels by 128 columns of pixels. However, the tile size (e.g., 256-by-24, 64-by-16, 512-by-32) may vary in other embodiments. The width of source image 34 may be greater than the width of the tile such that source image 34 may include multiple tiles in the horizontal direction. Also, the length of source image 34 may be greater than the length of the tile such that source image 34 may include multiple tiles in the vertical direction.

Each vertical scaler may be configured to generate a vertically scaled pixel on each clock cycle and convey the pixel to a corresponding horizontal scaler. In one embodiment, there may be four separate horizontal scalers within the pipeline for each color component channel, while in other embodiments, other numbers of horizontal scalers may be utilized per color component channel. In various embodiments, there may be a horizontal scaler corresponding to each vertical scaler within each color component channel of pipeline 10. Each horizontal scaler may generate horizontally scaled pixels from the received pixels.

In each color component channel, the horizontal scalers may output vertically and horizontally scaled pixels to normalization unit 24. In one embodiment, normalization unit 24 may be configured to convert received pixel values to the range between 0.0 and 1.0. For example, in one embodiment, the 10-bit pixel values output from a horizontal scaler may take on values from 0 to 1023. In such an embodiment, normalization unit 24 may divide the value received from the horizontal scaler by 1023 to change the range of the value. In other embodiments, normalization unit 24 may divide by other values depending on the number of bits used to represent pixel values. Also, normalization unit 24 may be configured to remove an optional offset from one or more of the pixel values. As shown in FIG. 1, the horizontal scalers in channel 14 are coupled to dither unit 32. In one embodiment, channel 14 may process an alpha channel and the outputs of the horizontal scalers in channel 14 may be conveyed to dither unit 32.

Normalization unit 24 may convey normalized pixel values to color space conversion (CSC) unit 26. CSC unit 26 may be configured to convert between two different color spaces. In various embodiments, the CSC unit may perform a color space conversion of the graphics data it receives. For example, in one embodiment, pixel values may be represented in source image 34 by a RGB color space. In this embodiment, pipeline 10 may need to generate output images in a YCbCr color space, and so CSC unit 26 may convert pixels from the RGB color space to the YCbCr color space. Various other color spaces may be utilized in other embodiments, and CSC unit 26 may be configured to convert pixels in between these various color spaces. In some embodiments, when a color space conversion is not required, the CSC unit may be a passthrough unit.

In one embodiment, CSC unit 26 may convey pixels to chroma downsampling unit 28. Chroma downsampling unit 28 may be configured to downsample the chroma components of the pixels in an inline, buffer-free fashion. Various types of downsampling may be performed (e.g., 4:2:2, 4:2:0). For example, in one embodiment, if the source image is in a 4:4:4 format and if the destination image is specified to utilize a 4:2:0 structure, then chroma downsampling unit 28 may perform vertical and horizontal downsampling of the chroma pixel components of the source image. In some scenarios, chroma downsampling unit 28 may be a passthrough unit if downsampling of the chroma pixel components is not needed.

Although not shown in FIG. 1, an interface may connect chroma downsampling unit 28 to a processor or other device which may convey configuration data to chroma downsampling unit 28. The chroma downsampling unit 28 may operate in different modes depending on the operational mode in which it is set. In one embodiment, chroma downsampling unit 28 may receive four pixels per chroma component per clock from CSC unit 26. In other embodiments, chroma downsampling unit 28 may receive other numbers of pixels per clock from CSC unit 26.

Chroma downsampling unit 28 may be coupled to reformatting unit 30. Reformatting unit 30 may be configured to reverse the normalization that was performed by normalization unit 24. Accordingly, the pixel values may be returned to the previous range of values that were utilized prior to the pixels being normalized by normalization unit 24. Pixels may pass through dither unit 32 after being reformatted, and dither unit 32 may insert noise to randomize quantization error. The output from dither unit 32 may be the processed destination image. In various embodiments, the processed destination image may be written to a frame buffer, to memory 12, to a display controller, to a display, or to another location. In other embodiments, graphics processing pipeline 10 may include other stages or units and/or some of the units shown in FIG. 1 may be arranged into a different order. Pipeline 10 is one example of a graphics processing pipeline and the methods and mechanisms described herein may be utilized with different types of other graphics processing pipelines.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown.

Figure 2:
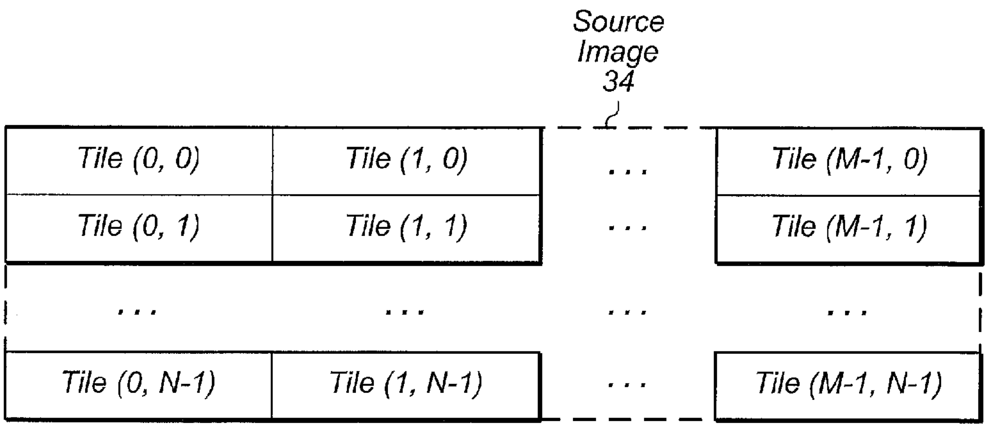
FIG. 2 is a block diagram that illustrates one embodiment of a source image partitioned into a plurality of tiles.

Turning now to FIG. 2, a block diagram of one embodiment of a source image partitioned into a plurality of tiles is shown. In one embodiment, source image 34 may be partitioned into M tiles in the horizontal direction and N tiles in the vertical direction. The tiles in the first column are numbered (0,0), (0,1), and so on, down to (0, N−1). The tiles in the first row are numbered (0,0), (1,0), and so on, over to (M−1, 0). The size of an individual tile may vary from embodiment to embodiment. For example, in one embodiment, an individual tile may be 16 lines by 128 columns, such that each line contains 128 pixels.

In one embodiment, tiles may be processed starting at the top left of the image, tile (0,0), and moving down the first column until reaching tile (0, N−1). After operating on the first column, tiles may be processed continuing at the top of the next column, tile (1,0). The vertical scalers may traverse through the tiles of the second column to the bottom of the column, and continue with this pattern until reaching the bottom right tile (M−1, N−1) of the image.

Each tile may be processed starting at the top left corner of the tile, and moving horizontally left to right until reaching the right edge of the tile. If a tile has 16 rows, and less than 16 pixels per column are processed in a single pass through the tile, then after reaching the right edge of the tile, processing may back to the left edge of the tile, moving down to the unprocessed rows of pixels. Each source image 34 may include up to four components per pixel, and so there may be four separate components stored for each pixel, organized and partitioned into tiles as shown in FIG. 2.

Typically, graphics processing may be performed using “line buffers” which are configured to store pixel data corresponding to a line of an image. For example, a line buffer would generally be needed to store an even line such that when odd lines are being processed there are two vertical pixels available to combine and downsample. It is noted that line buffers are costly in terms of space and power utilization. In the embodiments described herein, the chroma downsampling units do not include such line buffers. As described in more detail below, the chroma downsampling units operate on columns of vertically contiguous pixels. Therefore, the pixels are available for downsampling without requiring the storing and reloading of pixels. In addition, individual columns of pixels may be downsampled independently of contiguous columns of pixels. Furthermore, in various embodiments, a first column of pixels received in a first clock cycle may be downsampled simultaneously while receiving a second column of pixels adjacent to the first column.

Figure 3:
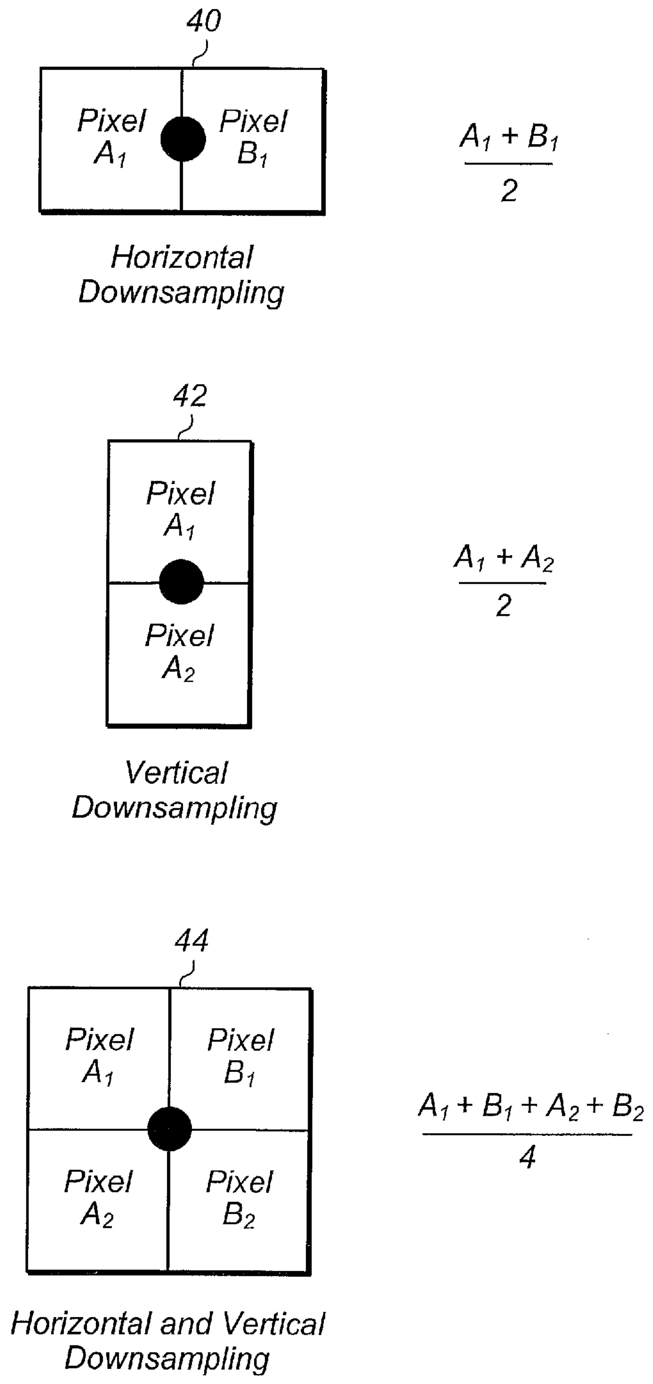
FIG. 3 shows three block diagrams that illustrate three different types of chroma downsampling.

Referring now to FIG. 3, three block diagrams of three different types of chroma downsampling are shown. In block diagram 40, horizontal downsampling is depicted between pixels $A_1$ and $B_1$. In one embodiment, the downsampled value may be the average of $A_1$ and $B_1$, as shown by the figure to the right of the pixels. The black dot centered between pixels $A_1$ and $B_1$ illustrates the position of the downsampled value with respect to the original pixels. In other embodiments, other types of downsampling between the two pixels may be performed, such that the weighting between pixels $A_1$ and $B_1$ may vary. For example, in another embodiment, pixel $A_1$ may be weighted at 75% and pixel $B_1$ may be weighted at 25% when generating the new pixel value. This may also be referred to as changing the phase of the resultant pixel from 0.5 to 0.25. The phase may be with respect to a luma (Y) sample position. Various other types of phases may be utilized when downsampling, other than the examples shown in FIG. 3. Furthermore, in other embodiments, other numbers of pairs of pixels may be simultaneously horizontally downsampled. For example, in one embodiment, eight pixels may be simultaneously horizontally downsampled by downsampling four pairs of pixel in the same clock cycle.

In block diagram 42, vertical downsampling is depicted between pixels $A_1$ and $A_2$. The resultant, downsampled chroma pixel value may take on the value of $(A_1+A_2)$ divided by two. In other embodiments, other phases may be utilized when performing vertical downsampling. Also, other numbers of pixels besides two may be simultaneously vertically downsampled. For example, if eight pixels are received in a clock cycle, then four pairs of adjacent vertical pixels may be vertically downsampled.

In block diagram 44, an example of horizontal and vertical downsampling is depicted for pixels $A_1$, $B_1$, $A_2$, and $B_2$. The resultant, downsampled chroma pixel value may take on the value of $(A_1+B_1+A_2+B_2)$ divided by four. In other embodiments, other phases may be utilized when performing horizontal and vertical downsampling. Also, other numbers of pixels besides four may be horizontally and vertically downsampled.

Although only three different types of downsampling are shown in FIG. 3, in other embodiments, other types of downsampling may be performed. For example, vertical downsampling may be performed to downsample four vertical pixels into a single pixel. Also, horizontal downsampling may be performed to downsample four horizontal pixels into a single pixel. In other embodiments, other numbers of pixels (e.g., eight, sixteen) may be downsampled into a single pixel.

Figure 4:
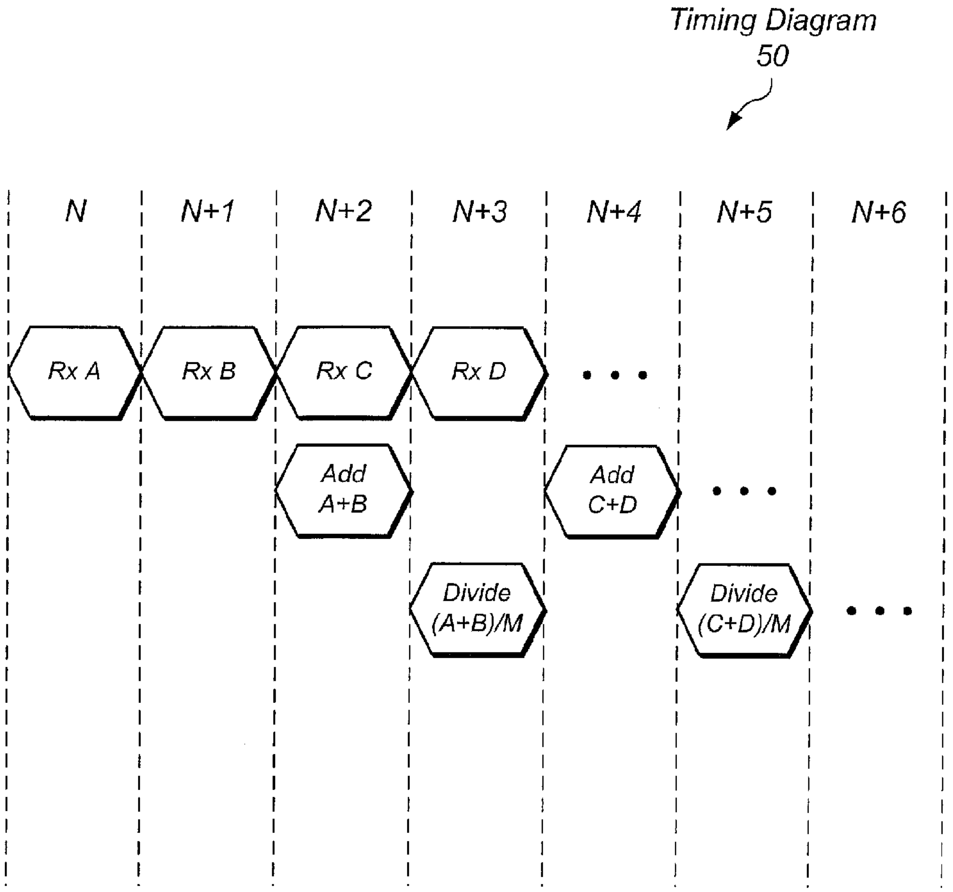
FIG. 4 is a timing diagram for one embodiment of a chroma downsampling unit.

Turning now to FIG. 4, a timing diagram for one embodiment of a chroma downsampling unit is shown. Timing diagram 50 illustrates the timing of operations for one of two modes, either horizontal chroma downsampling or horizontal and vertical chroma downsampling. It is noted that timing diagram 50 represents one possible embodiment of the operation of a chroma downsampling unit, and other sequences of operations for performing chroma downsampling are possible and are contemplated.

In clock cycle ‘N’, chroma pixel component values for a vertical column of pixels (A) may be received. The vertical column of pixels may include an even number of pixels. In one embodiment, four pixels from a vertical column of the source image may be received in clock cycle ‘N’. In other embodiments, other numbers of pixels may be received in each clock cycle. The vertical column of pixels may be received and clocked into four separate registers. The registers may also be referred to as flip-flops, or flops, for short.

In clock cycle ‘N+1’, a second vertical column of pixels (B) may be received. This second vertical column of pixels may have the same number of pixels as the first vertical column. In one embodiment, the second vertical column of pixels may be clocked into the same four registers that were utilized for the first vertical column in the previous clock cycle. The first vertical column of pixels may be clocked from the first set of four registers to a second set of four registers in the clock cycle 'N+1'. In another embodiment, separate sets of registers may be used for storing the first and second vertical columns of pixels.

In clock cycle 'N+2', pairs of pixels from the first (A) and second (B) columns of pixels may be added together. Also in clock cycle 'N+2', a new column of pixels (C) may be received, wherein column C is the adjacent column to the right of column B. In one embodiment, a rounding component may also be added to each pair from the first and second columns of pixels. The rounding component may be the binary equivalent of value 0.5 in base-10 representation. For example, if the chroma pixel components of columns A and B are represented by a 3-bit integer field and a 14-bit fractional field, then the rounding component may have a '1' in the $4^{th}$ bit (i.e., LSB) of a 4-bit number, with the rest of the bits '0'.

If only horizontal downscaling is enabled, then the pair of pixels from the same row (with one pixel in each of columns A and B) may be added together. For example, if there are four pixels per vertical column of pixels, such that four pixels are received per clock cycle, then the top pixel of column A and the top pixel of column B may be added together in a first adder, the second from the top pixel of column A and the second from the top pixel of column B may be added together in a second adder, and so on. Four different adders may be utilized in this embodiment. In another embodiment, if eight vertical pixels are received per clock cycle, then eight different adders may be utilized for computing the sums of eight separate pairs of pixels.

If both vertical and horizontal downscaling are enabled, then pixels from adjacent rows may be added together, such that four pixels that form a 2×2 square in the received image may be added together, with two pixels from the same row and two pixels from the next lower row added together. When referring to the received image, this refers to the image received from the previous stage in the graphics processing pipeline. The actual source image, meaning the source image that was received or fetched from memory, may have been modified by one or more previous stages (e.g., rotator, scaler) of the pipeline.

In the clock cycle 'N+3', the one or more sums calculated during the clock cycle 'N+2' may be divided by the value 'M'. Also in clock cycle 'N+3', a new column of pixels (D) may be received, which is the adjacent column to the right of column C. If only horizontal downsampling is being performed, then M may be two. If horizontal and vertical downsampling is being performed, then M may be four. In other embodiments, if other types of chroma downsampling are being performed, such as types that may be defined in the future for various image and video standards, then M may be other numbers (e.g., eight, sixteen). One or more dividers may be utilized to implement the division stage, depending on the number of pixels received per clock cycle and the type of downsampling being performed. In one embodiment, the dividers may perform division by dropping least significant bits (LSBs) from the calculated sums. For example, if divide-by-two is required, then the LSB from the sum may be dropped. If divide-by-four is required, then two LSBs may be dropped. The quotient(s) calculated in clock cycle 'N+3' may be output to the next stage of the graphics processing pipeline. The quotient(s) represent one or more downsampled chroma pixel components.

In clock cycle 'N+4', pixels from columns C and D may be added together. Also, although not shown, a new column of pixels may be received in clock cycle 'N+4'. On each clock cycle, a new column of pixels may be received, and the pattern of operations shown in FIG. 4 may be repeated for as long as columns of pixels are received.

In clock cycle 'N+5', pairs of pixels from columns C and D may be divided by 'M'. Downsampled chroma pixel components may be generated and conveyed to the next stage of the graphics processing pipeline on every other clock cycle. In one embodiment, columns of four pixels may be received each clock cycle. In this embodiment, if only horizontal downsampling is being performed, then four horizontally downsampled chroma pixel components may be generated on every other clock cycle. If horizontal and vertical downsampling is being performed, then two horizontally and vertically downsampled chroma pixel components may be generated on every other clock cycle. In various embodiments, the chroma pixel components may be clamped if they exceed maximum or minimum values prior to being conveyed to a next stage of the graphics processing pipeline.

This timing pattern of performing horizontal chroma downsampling may continue indefinitely, such that pixels from a vertical column may be received in each clock cycle, and addition and division steps may be performed every other clock cycle. The received image may be partitioned into tiles, and tiles may be downsampled by a chroma downsampling unit beginning in the upper-left block of the image, and then downsampling may proceed down the left-most column of tiles until reaching the bottom edge of the image. Then tiles may be downsampled continuing at the top of the second left-most column and continuing in this manner throughout the rest of the image.

In other embodiments, other sequences of steps may be executed to perform chroma downsampling. In other embodiments, other variations of chroma downsampling routines may be utilized. The example illustrated in timing diagram 50 is only one possible example of a sequence of steps which may be taken to perform horizontal chroma downsampling.

Figure 5:
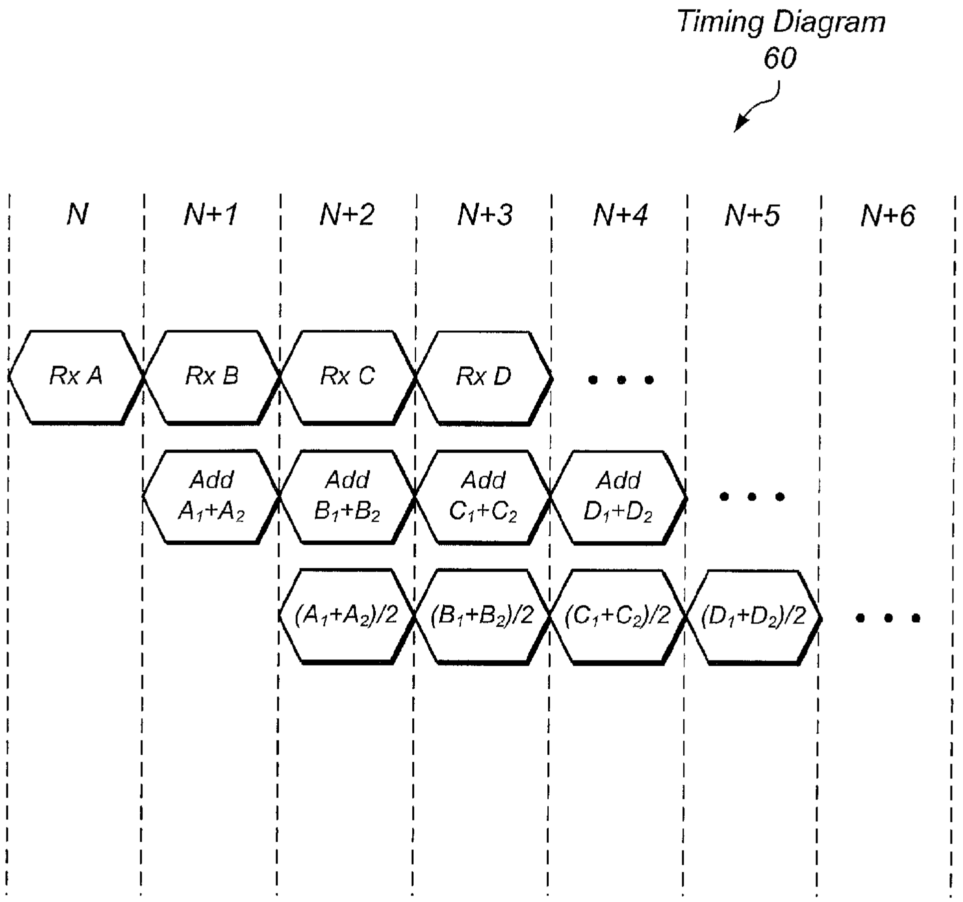
FIG. 5 is another timing diagram for one embodiment of a chroma downsampling unit.

Referring now to FIG. 5, another timing diagram for one embodiment of a chroma downsampling unit is shown. Timing diagram 60 illustrates the scenario where only vertical chroma downsampling is being performed. To perform vertical downsampling, the first column of pixels (A) is received in clock cycle 'N'. In subsequent clock cycles, adjacent columns of pixels may be received, such as column B in clock cycle 'N+1', column C in clock cycle 'N+2', and column D in clock cycle 'N+3'. This pattern may continue for any number of clock cycles for as long as additional pixel data is received by the chroma downsampling unit. Also, a delay of one or more clock cycles may occur from time to time, and the chroma downsampling unit may pause during these delays and resume processing when additional input pixel columns are received.

In clock cycle 'N+1', pairs of chroma pixel components from adjacent rows in column A may be added together. In one embodiment, a rounding component may be added to the pixels. Any number of pairs of chroma pixel components may be added together in clock cycle 'N+1', depending on how many pixels are received from column A. For example, if four pixels are received from column A, then two sums may be calculated: $(A_1+A_2)$ and $(A_3+A_4)$. These operations may be repeated for columns B-D in clock cycles 'N+2' through 'N+4'.

In clock cycle 'N+2', each of the sums of pairs of chroma pixel components from column A may be divided by two. In one embodiment, dividing by two may be accomplished by dropping the LSB from the sum. In some embodiments, the division stage may be performed in the same clock cycle as the addition stage. In clock cycles 'N+3' through 'N+5', the sums calculated in the prior clock cycle (for columns B-D) may be divided by two. While timing diagram 60 only shows $(A_1+A_2)/2$, $(B_1+B_2)/2$, and so on, for each of the clock cycles 'N+2' through 'N+5', it is to be understood that any number (e.g., 2, 4, 6) of sums of pairs of pixels may be divided by two in each clock cycle. The number of divide operations performed is based on the number of pixels received in each column of pixels.

In another embodiment, a horizontal row of pixels may be received in each clock cycle by the chroma downsampling unit, and contiguous rows may be received on consecutive clock cycles. In this embodiment, the chroma downsampling unit may still perform buffer-free downsampling of chroma pixel components by reversing the way it performs vertical and horizontal downsampling. In this embodiment, the unit may perform horizontal downsampling using the chroma pixel components received in a single clock cycle. For vertical downsampling, the unit may add together chroma pixel components received on consecutive clock cycles.

Figure 6:
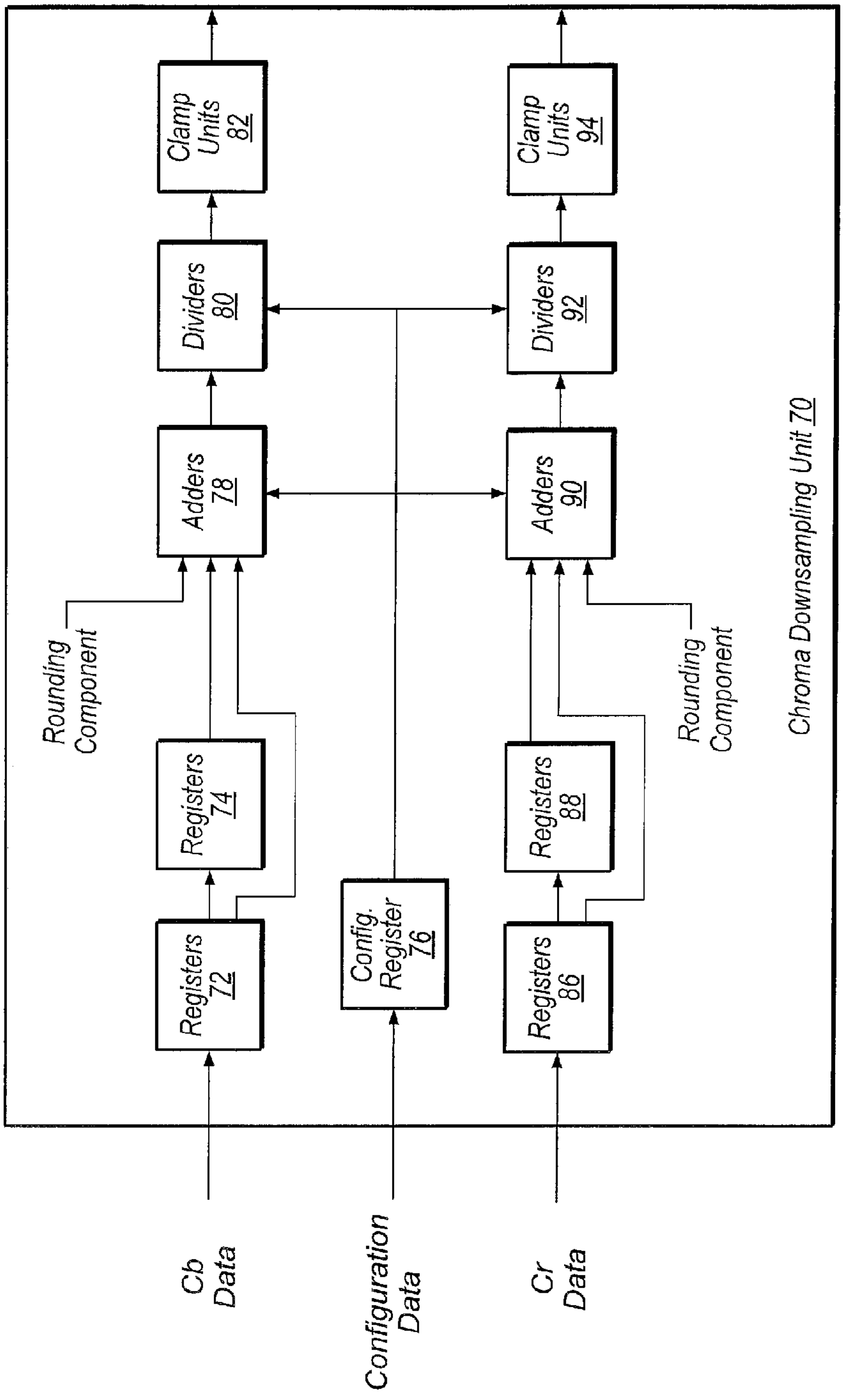
FIG. 6 is a block diagram of one embodiment of a chroma downsampling unit.

Referring now to FIG. 6, a block diagram of one embodiment of a chroma downsampling unit is shown. In one embodiment, chroma downsampling unit 70 may be part of a graphics processing pipeline, such as pipeline 10 of FIG. 1. In another embodiment, chroma downsampling unit 70 may be a standalone unit utilized by a processor, SoC, co-processor, or other computing device. Although not shown in FIG. 6, unit 70 may also include an alternate path through the unit in cases when chroma downsampling is not enabled and unit 70 is configured as a passthrough unit.

Chroma downsampling unit 70 may include two separate channels for Cb and Cr data. Chroma pixel components from a first column of the received image may be clocked into registers 72 and 86 for the Cb and Cr data, respectively, in a first clock cycle. Then, the first column may be clocked into registers 74 and 88 in a second clock cycle, while simultaneously a second column is clocked into registers 72 and 86. Adders 78 and 90 are representative of any number of adders that may be utilized as part of chroma downsampling unit 70. The number of adders being utilized may depend on the number of pixels that are received in each clock cycle. Adders 78 and 90 may perform different types of addition operations with various numbers of inputs depending on the value of configuration register 76. In one embodiment, a rounding component may be coupled to the inputs of adders 78 and 90.

Adders 78 and 90 may convey the calculated sums to dividers 80 and 92, respectively. In one embodiment, adders 78 and 90 and dividers 80 and 92 may be implemented using pipelined math. Pipelined math allows new data to be received on each clock cycle, and pipelining also allows a result to be generated on each clock cycle, after the initial lag. Dividers 80 and 92 are representative of any number of dividers that may be utilized as part of chroma downsampling unit 70. In one embodiment, dividers 80 and 92 may drop LSBs of the sums received from adders 78 and 90 to perform the actual division step. In another embodiment, dividers 80 and 92 may perform division by shifting the radix point to the left by the appropriate number of bits. The output of dividers 80 and 92 may be conveyed to clamp units 82 and 946, respectively. Clamp units 82 and 94 may clamp any values that are above a maximum or below a minimum value. In another embodiment, clamp units 82 and 94 may be omitted from chroma downsampling unit 70.

The configuration data conveyed to configuration register 76 may set the specific mode in which chroma downsampling unit 70 operates. In one embodiment, the mode may be one of horizontal, vertical, horizontal and vertical downsampling, or passthrough. The configuration data may also include other information, such as an indicator when a new tile is being processed, a new set of rows of the tile are being traversed, and/or other relevant information.

In one embodiment, chroma downsampling unit 70 may process chroma pixel components from a received image on a tile-by-tile basis. Within an individual tile, chroma downsampling unit 70 may move horizontally across columns of a tile of a received image from left to right, and responsive to reaching a right edge of the image, unit 70 may move down to a next set of rows on a left edge of the tile and continue this pattern throughout the entirety of the tile.

The block diagram shown in FIG. 6 is only one possible embodiment of a chroma downsampling unit. Other embodiments of chroma downsampling units may include other components organized in a different manner, depending on the specific implementation of chroma downsampling. For example, in another embodiment, input registers 72 and 74 may be arranged in a parallel fashion, such that a first column of data is input to registers 72 and a second column of data (in a subsequent clock cycle) is input to registers 74. A switch may be utilized to toggle between the two sets of registers. Registers 86 and 88 may be similarly organized. Other types of structures of the registers, adders, dividers, clamp units, and other additional components within unit 70 are possible and are contemplated.

Figure 7:
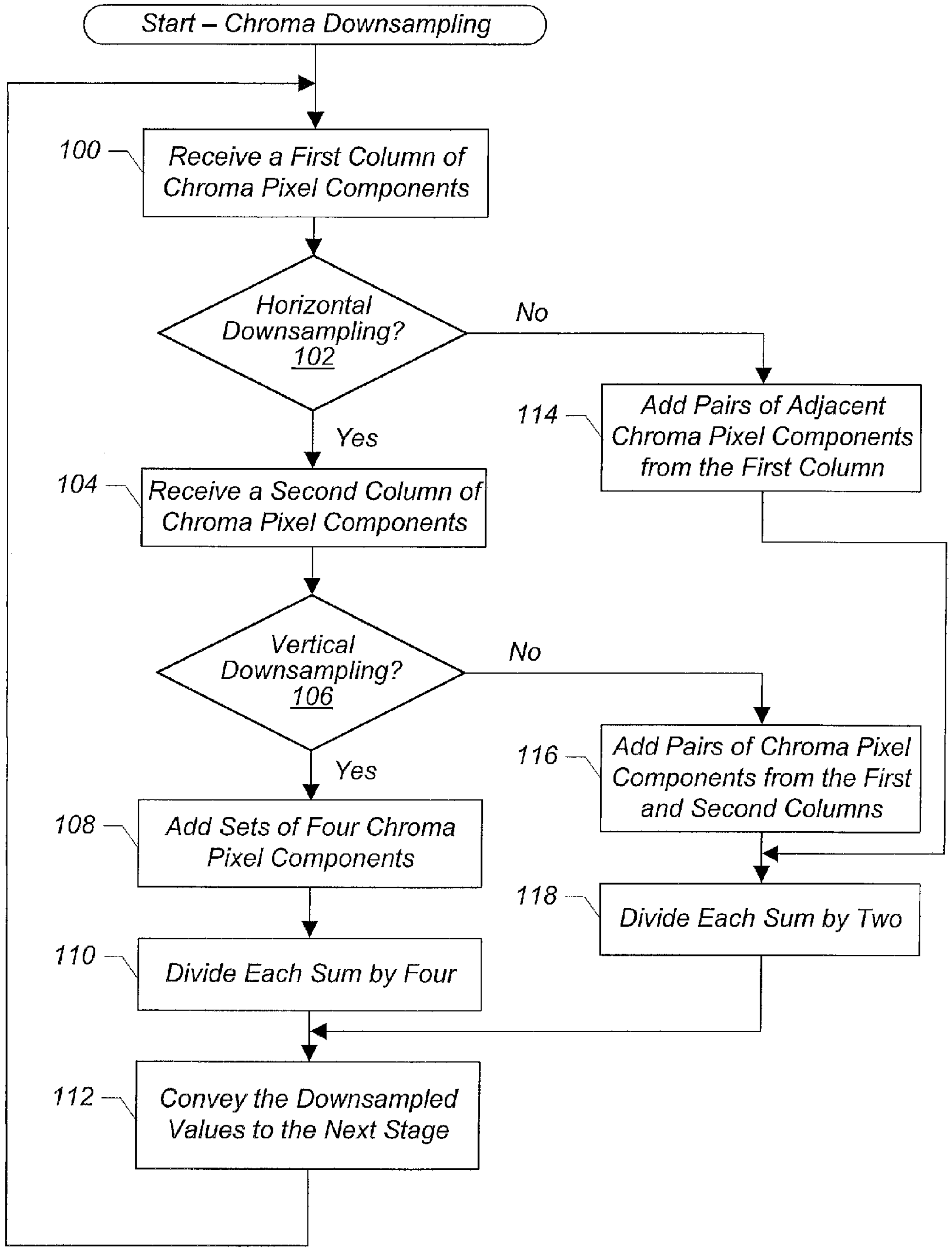
FIG. 7 is a generalized flow diagram illustrating one embodiment of a method for downsampling chroma pixel components.

Referring now to FIG. 7, one embodiment of a method for downsampling chroma pixel components is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a first column of chroma pixel components may be received by a chroma downsampling unit (block 100). If horizontal downsampling is enabled for the chroma downsampling unit (conditional block 102), then a second column of chroma pixel components may be received by the chroma downsampling unit (block 104) prior to performing a downsampling operation. In one embodiment, the chroma downsampling unit may include a programmable configuration register, and the value of the configuration register may determine what type of downsampling is enabled.

If horizontal downsampling is not enabled for the chroma downsampling unit (conditional block 102), then pairs of adjacent chroma pixel components from the first column may be added together (block 114). If horizontal downsampling is not enabled for the chroma downsampling unit, then it will be assumed for the purposes of this discussion that vertical downsampling is enabled. In one embodiment, a rounding component may be added to each pair of chroma pixel components in block 114. After block 114, the sum of each pair of chroma pixel components may be divided by two (block 118), which generates a downsampled chroma pixel component value for each pair. In one embodiment, dividing each sum by two may be implemented by dropping a LSB from the sum. Then, each downsampled chroma pixel component value may be conveyed to the next stage of the graphics processing pipeline (block 112).

After block 104, if vertical downsampling is also enabled for the chroma downsampling unit (conditional block 106), then sets of four chroma pixel components including two components from each of the first and second columns may be added together (block 108). The number of sets of four chroma pixel components being added together is dependent on the number of chroma pixel components per column. For example, if the first and second columns each contain four chroma pixel components, then two sets of four chroma pixel components may be added together. Also, in one embodiment, a rounding component may be added to each set of chroma pixel components in block 108. Then, each sum generated in block 108 may be divided by four (block 110). In one embodiment, division by four may be implemented by dropping two LSBs from the sum. After block 110, each downsampled chroma pixel component value may be conveyed to the next stage of the graphics processing pipeline (block 112).

If vertical downsampling is not enabled for the chroma downsampling unit (conditional block 106), then pairs of chroma pixel components from the first and second columns may be added together (block 116). A rounding component may also be added to each pair of chroma pixel components. Next, each of the sums calculated in block 116 may be divided by two (block 118). In one embodiment, dividing each sum by two may be implemented by dropping a LSB from the sum. After block 118, each downsampled chroma pixel component value may be conveyed to the next stage of the graphics processing pipeline (block 112).

After conveying downsampled chroma pixel component values to the next stage of the graphics processing pipeline (block 112), the method may return to block 100 and another column of chroma pixel components may be received. Alternatively, downsampled chroma pixel component values may be conveyed to the next stage (block 112) while the chroma downsampling unit is simultaneously receiving the next column of chroma pixel components (block 100). This method may continue for as long as columns of chroma pixel components are received by the chroma downsampling unit.

Figure 8:
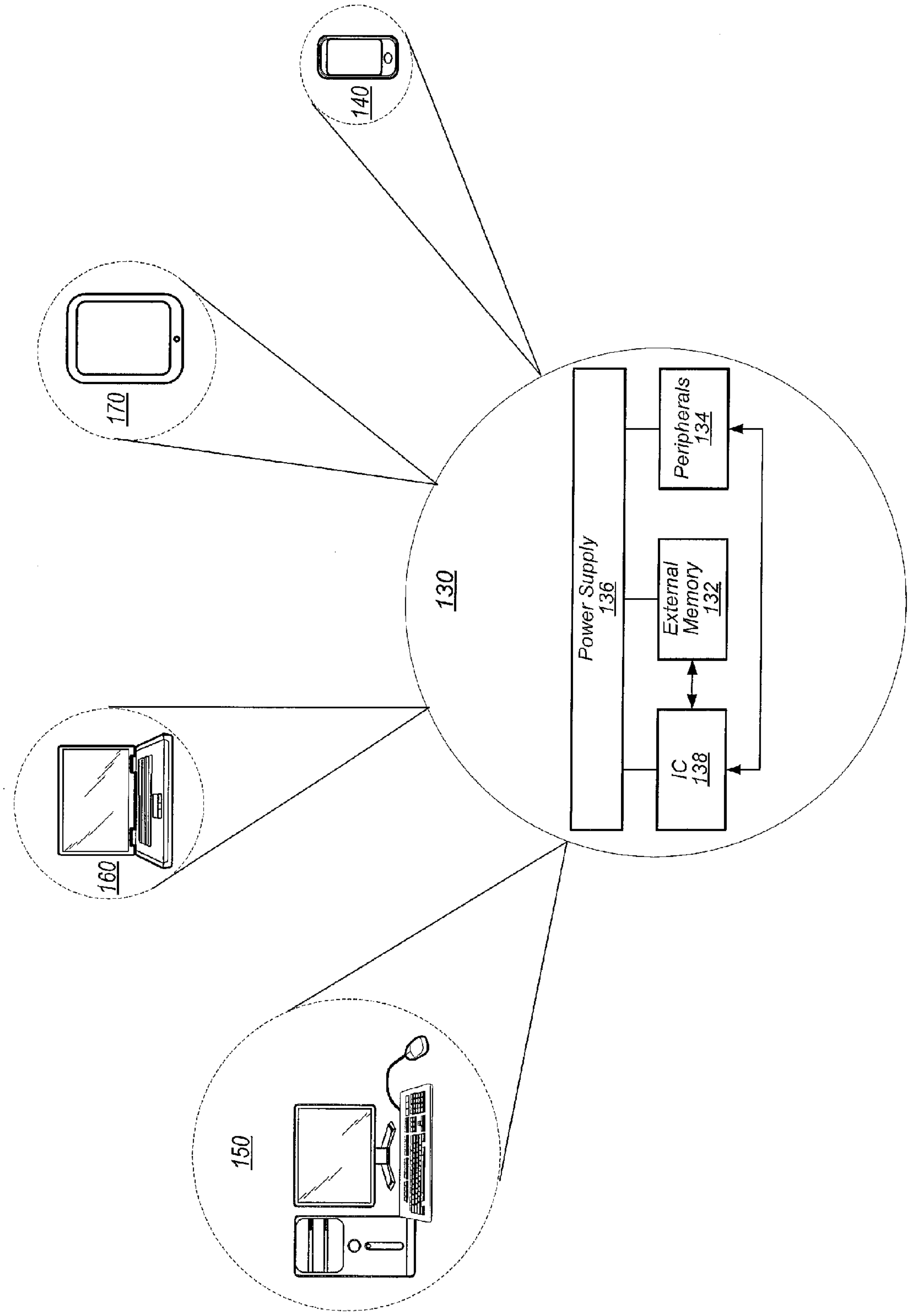
FIG. 8 is a block diagram of one embodiment of a system.

Referring next to FIG. 8, a block diagram of one embodiment of a system 130 is shown. As shown, system 130 may represent chip, circuitry, components, etc., of a cell phone 140, desktop computer 150, laptop computer 160, tablet computer 170, or otherwise. In the illustrated embodiment, the system 130 includes at least one instance of an integrated circuit (IC) 138 coupled to an external memory 132. IC 138 may include one or more instances of graphics processing pipeline 10 (of FIG. 1). In some embodiments, IC 138 may be a SoC with one or more processors and one or more graphics processing pipelines.

IC 138 is coupled to one or more peripherals 134 and the external memory 132. A power supply 136 is also provided which supplies the supply voltages to IC 138 as well as one or more supply voltages to the memory 132 and/or the peripherals 134. In various embodiments, power supply 136 may represent a battery (e.g., a rechargeable battery in a smart phone, laptop or tablet computer). In some embodiments, more than one instance of IC 138 may be included (and more than one external memory 132 may be included as well).

The memory 132 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 138 in a chip-on-chip configuration, a package-on-package configuration, or a multi-chip module configuration.

The peripherals 134 may include any desired circuitry, depending on the type of system 130. For example, in one embodiment, peripherals 134 may include devices for various types of wireless communication, such as wifi, Bluetooth, cellular, global positioning system, etc. The peripherals 134 may also include additional storage, including RAM storage, solid state storage, or disk storage. The peripherals 134 may include user interface devices such as a display screen, including touch display screens or multitouch display screens, keyboard or other input devices, microphones, speakers, etc.

Figure 9:
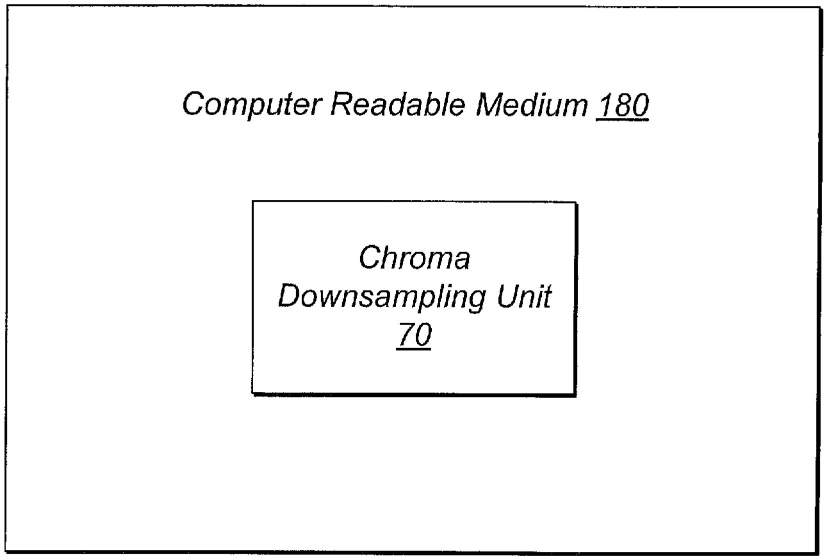
FIG. 9 is a block diagram of one embodiment of a computer readable medium.

Turning now to FIG. 9, one embodiment of a block diagram of a computer readable medium 180 including one or more data structures representative of the circuitry included in chroma downsampling unit 70 (of FIG. 6) is shown. Generally speaking, computer readable medium 180 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 180 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 180 may be the netlist(s) (with or without the synthesis library) or the data set(s), as desired. In yet another alternative, the data structures may comprise the output of a schematic program, or netlist(s) or data set(s) derived therefrom.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A graphics processing pipeline comprising a chroma downsampling unit, wherein the chroma downsampling unit is configured to:

receive a column of contiguous chroma pixel components of an image;

produce downsampled chroma blue and red pixel components on every other clock cycle when performing only horizontal downsampling, wherein performing only horizontal downsampling comprises:

writing a first column of chroma blue and red pixel components to a first set of registers in a first clock cycle;

clocking the first column of chroma blue and red pixel components through to a second set of registers in a second clock cycle, wherein the second clock cycle is immediately after the first clock cycle;

writing a second column of chroma blue and red pixel components to the first set of registers in the second clock cycle;

adding together values from the first set of registers and the second set of registers in a third clock cycle;

dividing the values added together by two in a fourth clock cycle to calculate an average of each pair of chroma blue and red pixel components from both columns; and conveying downsampled chroma blue and red pixel components to a next stage of the graphics processing pipeline on every other clock cycle when performing only horizontal downsampling.

2. The graphics processing pipeline as recited in claim 1, wherein said addition and division steps are performed on every other clock cycle when only horizontal downsampling is performed.

3. The graphics processing pipeline as recited in claim 1, wherein the chroma downsampling unit is configured to receive chroma pixel components from a previous stage of the graphics processing pipeline, and wherein the chroma pixel components received by the chroma downsampling unit are located within a single column of the image.

4. The graphics processing pipeline as recited in claim 1, wherein the image is partitioned into a plurality of tiles, wherein a width of each tile is less than a width of the image, wherein a length of each tile is less than a length of the image, and wherein the graphics processing pipeline is configured to process the image on a tile-by-tile basis beginning in an upper-left tile of the image and proceeding down a left-most column of tiles until reaching a bottom edge of the image.

5. The graphics processing pipeline as recited in claim 1, wherein a previous stage of the graphics processing pipeline is a color space conversion unit, and wherein the color space conversion unit is configured to convey the chroma pixel components to the chroma downsampling unit in each clock cycle, and wherein a subsequent stage of the graphics processing pipeline is a reformatting unit, and wherein the chroma downsampling unit is configured to convey downsampled chroma blue and red pixel components to the reformatting unit.

6. The graphics processing pipeline as recited in claim 1, wherein the chroma downsampling unit is configured to convert a 4:4:4 YCbCr format into a 4:2:2 YCbCr format when performing only horizontal downsampling.

7. A chroma downsampling unit configured to:

receive a column of chroma pixel components of an image;

produce downsampled chroma blue and red pixel components on every other clock cycle when performing only horizontal downsampling, wherein performing only horizontal downsampling comprises:

writing a first column of chroma blue and red pixel components to a first set of registers in a first clock cycle;

clocking the first column of chroma blue and red pixel components through to a second set of registers in a second clock cycle, wherein the second clock cycle is immediately after the first clock cycle;

writing a second column of chroma blue and red pixel components to the first set of registers in the second clock cycle;

adding together values from the first set of registers and the second set of registers in a third clock cycle;

dividing the values added together by two in a fourth clock cycle to calculate an average of each pair of chroma blue and red pixel components from both columns; and convey downsampled chroma blue and red pixel components to a next stage of a graphics processing pipeline on every other clock cycle when performing only horizontal downsampling.

8. The chroma downsampling unit as recited in claim 7, wherein a first column of chroma blue and red pixel components is downsampled concurrent with receipt of a second column of chroma blue and red pixel components, wherein the second column is adjacent to the first column, and wherein the chroma downsampling unit is configured to add two or more chroma blue or red pixel components to generate a sum, and then divide the sum by a number of chroma blue or red pixel components when downsampling.

9. The chroma downsampling unit as recited in claim 8, wherein said addition and division steps are performed on every other clock cycle when performing only horizontal downsampling.

10. The chroma downsampling unit as recited in claim 8, wherein the image is partitioned into a plurality of tiles, and wherein the chroma downsampling unit is configured to process the image on a tile-by-tile basis beginning in an upper-left tile of the image and proceeding down a left-most column of tiles until reaching a bottom edge of the image.

11. The chroma downsampling unit as recited in claim 8, wherein dividing the sum is performed by dropping one or more least significant bits (LSBs).

12. The chroma downsampling unit as recited in claim 8, wherein comprises the chroma downsampling unit is configured to convert a 4:4:4 YCbCr format into a 4:2:2 YCbCr format when performing only horizontal downsampling.

13. The chroma downsampling unit as recited in claim 7, wherein the column of chroma pixel components received in each clock cycle includes an even number of chroma pixel components.

14. A method comprising:

receiving a plurality of chroma pixel components, wherein the plurality of pixel chroma components are located in a column of an image;

producing downsampled chroma blue and red pixel components on every other clock cycle when performing horizontal downs amp ling, wherein performing only horizontal downsampling comprises:

writing a first column of chroma blue and red pixel components to a first set of registers in a first clock cycle;

clocking the first column of chroma blue and red pixel components through to a second set of registers in a second clock cycle, wherein the second clock cycle is immediately after the first clock cycle;

writing a second column of chroma blue and red pixel components to the first set of registers in the second clock cycle;

adding together values from the first set of registers and the second set of registers in a third clock cycle;

dividing the values added together by two in a fourth clock cycle to calculate an average of each pair of chroma blue and red pixel components from both columns; and conveying downsampled chroma blue and red pixel components to a next stage of the graphics processing pipeline on every other clock cycle when performing only horizontal downsampling.

15. The method as recited in claim 14, wherein downsampling is performed without using a buffer and without accessing memory, and wherein downsampling is performed by calculating an average of an even number of chroma blue or red pixel components.

16. The method as recited in claim 14, wherein said addition and division steps are performed on every other clock cycle when performing only horizontal downsampling.

17. The method as recited in claim 14, further comprising:

partitioning the image into a plurality of tiles; and processing the image on a tile-by-tile basis beginning in an upper-left tile of the image and proceeding down a left-most column of tiles until reaching a bottom edge of the image, wherein chroma blue and red pixel components are downsampled from a given tile starting on a leftmost column of the given tile and moving horizontally left-to-right through the given tile column-by-column.

18. The method as recited in claim 14, further comprising generating a plurality of downsampled chroma blue and red pixel components, wherein the plurality of generated downsampled chroma blue and red pixel components is fewer than the plurality of received chroma blue and red pixel components.

19. The method as recited in claim 14, wherein performing only horizontal downsampling comprises converting a 4:4:4 YCbCr format into a 4:2:2 YCbCr format.

* * * * *

UNITED STATES PATENT AND TRADEMARK OFFICE

CERTIFICATE OF CORRECTION

PATENT NO. : 9,123,278 B2
APPLICATION NO. : 13/404733
DATED : September 1, 2015
INVENTOR(S) : Tripathi et al.

It is certified that error appears in the above-identified patent and that said Letters Patent is hereby corrected as shown below:

In the Claims:

Column 16, Claim 12, Line 19, please delete "claim 8" and substitute -- claim 7 --.

Column 16, Claim 12, Line 20, please delete "comprises".

Column 16, Claim 14, Line 33, please delete "downs amp ling" and substitute -- downsampling --.

Signed and Sealed this
Twenty-ninth Day of December, 2015

Michelle K. Lee
*Director of the United States Patent and Trademark Office*